United States Patent [19]
Rand

[11] Patent Number: 5,838,766
[45] Date of Patent: Nov. 17, 1998

[54] SYSTEM AND METHOD FOR PROVIDING SHARED RESOURCES TO TEST PLATFORMS

[75] Inventor: Kevin W. Rand, Garland, Tex.

[73] Assignee: MCI Communications Corporation, Washington, D.C.

[21] Appl. No.: 721,409

[22] Filed: Sep. 26, 1996

[51] Int. Cl.$^6$ .............................. H04M 1/24; H04M 3/08; H04M 3/22

[52] U.S. Cl. .................................. 379/9; 379/10; 379/15; 370/244

[58] Field of Search .................................. 379/9, 10, 11, 379/12, 13, 14, 15, 19, 22, 1, 8, 16, 17, 26; 370/248, 249, 250, 251; 395/674, 672, 200.04, 200.12, 200.56, 200.59

[56] References Cited

U.S. PATENT DOCUMENTS

| | | | |
|---|---|---|---|
| 3,893,024 | 7/1975 | Reines et al. ................................ | 379/1 |
| 4,747,130 | 5/1988 | Ho ........................................... | 379/269 |
| 5,065,422 | 11/1991 | Ishikawa .................................... | 379/11 |
| 5,313,453 | 5/1994 | Uchida et al. ............................. | 370/13 |
| 5,347,270 | 9/1994 | Matsuda et al. ........................... | 379/10 |
| 5,392,328 | 2/1995 | Schmidt et al. ........................... | 379/16 |
| 5,416,825 | 5/1995 | Renger et al. ............................. | 379/29 |
| 5,475,732 | 12/1995 | Pester, III ................................. | 379/34 |
| 5,495,470 | 2/1996 | Tyburski et al. ........................... | 379/15 |
| 5,500,851 | 3/1996 | Kozaki et al. ............................. | 370/13 |
| 5,500,853 | 3/1996 | Engdahl et al. ............................ | 379/1 |
| 5,539,804 | 7/1996 | Hong et al. ................................ | 379/33 |
| 5,546,450 | 8/1996 | Suthard et al. ........................... | 379/207 |
| 5,592,530 | 1/1997 | Brockman et al. ........................ | 379/34 |
| 5,602,828 | 2/1997 | Engdahl et al. ........................... | 370/228 |
| 5,608,720 | 3/1997 | Biegel et al. .............................. | 370/249 |
| 5,633,909 | 5/1997 | Fitch ......................................... | 379/15 |
| 5,654,901 | 8/1997 | Boman ...................................... | 379/1 |
| 5,673,255 | 9/1997 | Dunn et al. ................................ | 379/14 |

OTHER PUBLICATIONS

International Search Report for PCT/US97/17148 mailed 10 Feb. 1998.

*Primary Examiner*—Curtis A. Kuntz
*Assistant Examiner*—Rexford N. Barnie

[57] ABSTRACT

A test system for testing a plurality of switches. A test platform requests the resources required for performing a test. A central configuration queue manager (CQM) determines whether the requested resources are available and allocates the resources to the test platform. However, Some resources may be allocated in blocking mode. That is, subsequent commands requesting such an allocated resource are queued until the resource is released/available. An example of a resource which may be allocated in blocking mode is a connection to a switch from a test platform. Other resources may be allocated in a non-blocking mode. An example of a resource which may be allocated in a non-blocking mode is an operator services trunk.

20 Claims, 5 Drawing Sheets

SYSTEM AND METHOD FOR PROVIDING SHARED RESOURCES TO TEST PLATFORMS

RELATED APPLICATIONS

This application is related to a commonly owned application, filed on even date herewith, entitled "A System and Method for Providing Resources to Test Platforms" and having Ser. No. 08/721,407 filed Sep. 26, 1996, which is incorporated herein by reference.

BACKGROUND OF THE INVENTION

1. Field of the Invention

The present invention relates generally to the field of telecommunications, and more particularly to a system and method for providing shared resources to test platforms.

2. Related Art

Telecommunications equipment and services are often tested prior to being deployed into commercial environments. Commercial environments include network elements (e.g., switches) from various manufacturers. These network elements may further include varying revisions of software. A goal of the testing process prior to deployment is to identify and resolve any potential problems in providing network services. The problems may include, for example, compatibility problems between newly developed network elements and/or software.

An organization may employ several test platforms to perform several tests in parallel on several switches. Examples of such switches include an AXE switch from Ericsson, Inc., and a DEX switch from DSC Communications Corporation. A test platform may require several resources to perform a test. For example, test platforms may require connections to several switches to send commands corresponding to a test and to gather results of the test.

Generally, providing dedicated resources to each test platform is often impractical due to cost and manageability considerations. For example, connecting 30 test platforms to 50 switches would require 1500 (i.e., 5×10) dedicated connections. It may be cost prohibitive to provide the large number of wires/trunks required for such dedicated connections. It may also be quite onerous to manage efficiently the large number of wires/trunks.

Some of the resources may be shared by several test platforms to decrease the aggregate number of resources provided in a test environment. However, sharing resources may present new problems. For example, a shared resource may need to be allocated to a test platform before the test platform can utilize the resource. An inefficient scheme of allocation of shared resources may result in undue delays in completing the performance of a test, which may be unacceptable.

Therefore, what is needed is a system and method of efficiently providing the shared resources to test platforms in a test environment.

SUMMARY OF THE INVENTION

The present invention is described in the context of a system in which a plurality of switches are tested. The system comprises a first test platform for performing a first test, and a second platform for performing a second test. Both the first platform and the second platform require a shared resource to perform the respective tests. The first test platform sends a first command requesting the shared resource and the second platform then sends a second command requesting the shared resource.

The present invention includes a manager for receiving the first command and then the second command. The manager allocates the shared resource to the first platform, and then allocates the shared resource to the second platform upon the occurrence of a condition. The test platforms perform the respective tests upon being allocated the resource.

The condition comprises receiving a resource release command from the first test platform. The manager of the present invention maintains a queue for the shared resource, and queues the second command in the queue until the resource release command is received.

The test system further comprises a cross connect coupled to the first test platform by a first test trunk and to the second test platform by a second test trunk. The cross connect is also connected to a switch by a switch trunk. The cross connect provides a connection between the switch and one of the two test platforms by connecting the corresponding test trunk to the switch trunk. The resources managed by the manager includes such a connection to the switch.

The manager of the present invention further comprises a storage for storing information indicative of which ports of the cross-connect are connected to the switch trunk and the test trunks. A resource management module examines the information stored in the storage to determine which ports are to be connected to provide the connection requested by the commands, and sends a connect command to the cross-connect to cause the cross-connect to to connect the ports.

The condition upon which the shared resource is allocated to the second test platform includes specifying that access to the shared resource is to be provided in a non-blocking mode. When the shared resource may be accessed in a non-blocking mode, the manager deallocates the resource from the first test platform and allocates the resource to the second test platform upon receiving the second command.

In a preferred embodiment of the present invention, the first command sent by the first test platform specifies whether subsequent requests to the shared resource are to be processed in a non-blocking mode. If the first command requests the resource in non-blocking mode, the manager deallocates the resource from the first test platform upon receiving a command request for the resource from the second test platform. The first test platform is reallocated the shared resource after the second test platform sends a resource release command.

Resources which may be accessed in non-blocking mode includes an operator services trunk originating from a non-bridging switch. The first and second commands specify to which of a plurality of bridging switches the operator service trunk is to point. To allocate the bridging switch to a test platform, the manager automatically logs on to the non-bridging switch to change configuration on the non-bridging switch to have the operator services trunk point to the bridging switch as specified by a command from the test platform.

As a shared resource is dynamically allocated to test platforms, the resource may be optimally utilized.

Due to optimal utilization of resources, the aggregate amount of time to complete the performance a set of tests may be minimized.

As a test platform requesting a shared resource may specify that the shared resource is to be allocated in blocking mode, and as all subsequent commands are forced to wait until the test platform releases the shared resource, the present invention enables test systems to optionally have exclusive control of shared resources while performing a test.

By providing for non-blocking access to a shared resource, the resource may not be tied to a test platform while the resource is not being use.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 8 is a diagram illustrating further the structure of a global memory block in one embodiment of the present invention.

DETAILED DESCRIPTION OF THE PREFERRED EMBODIMENTS

Figure 1:
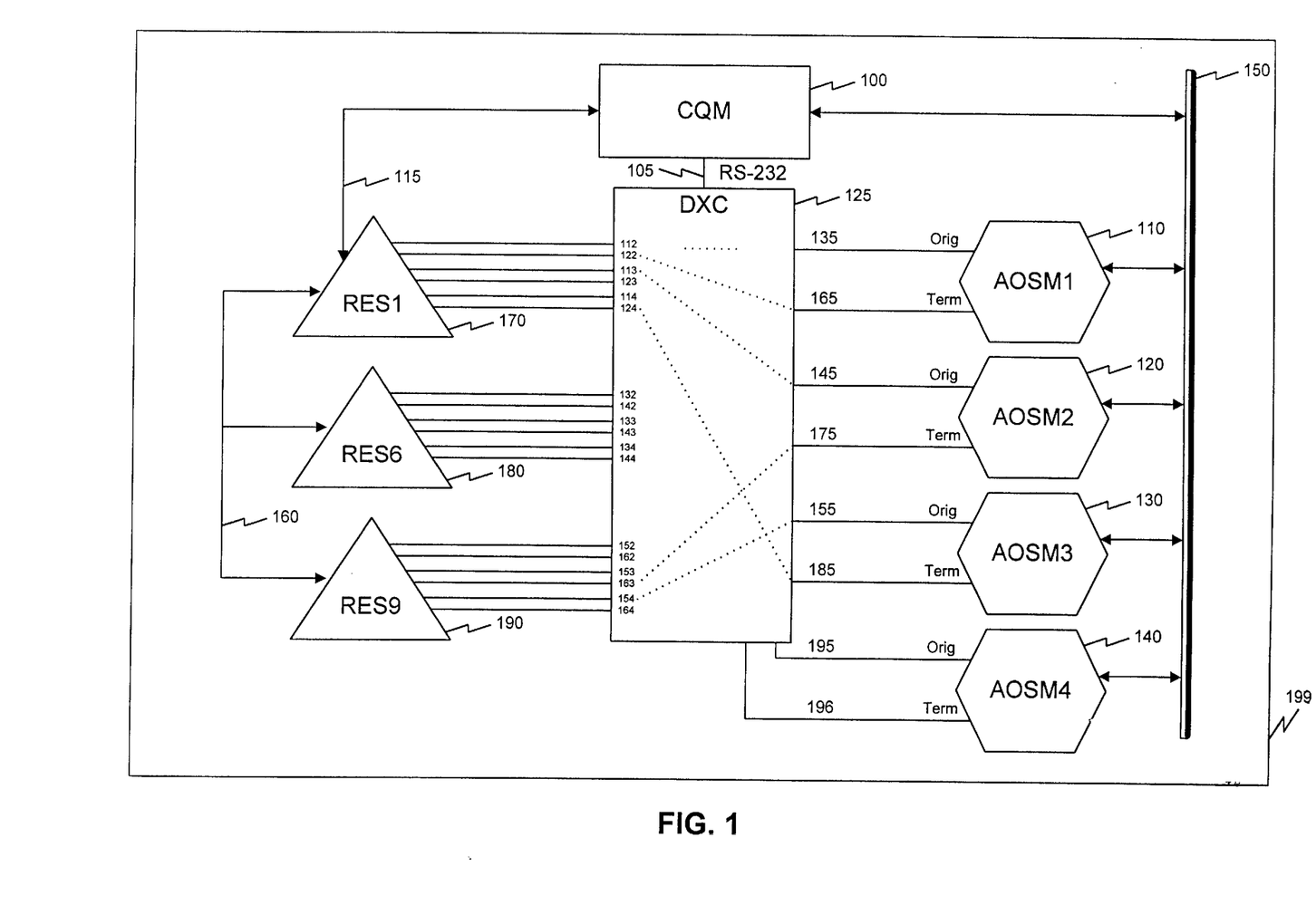
FIG. 1 is a block diagram of a test system including several test platforms for testing a plurality of switches.

FIG. 1 is block diagram illustrating a test system 199 comprising four test platforms AOSM1 110, AOSM2 120, AOSM3 130 and AOSM4 140, configuration queue manager (CQM) 100, digital cross connect (DXC) 125, trunk network 160, CQM connection network 150, and three switches RES1 170, RES6 180 and RES9 190. Each switch 170, 180 and 190 is shown connected to DXC 125 by three pairs of switch trunks (e.g., RES1 170 is connected to DXC 125 by switch trunks 112–114 and 122–124). Each test system 110, 120, 130, and 140 is shown connected to DXC 125 by a pair of test trunks (135, 145, 155, 195 and 165,175,185, 196). CQM 100 is connected to DXC 125 by command bus 105, and to RES1 170 by communication path 115.

The system and method of allocating a resource of the present invention is described mostly with reference to AOSM1 110 and switch RES1 170. However, it should be understood that the description is applicable to other switches 120 and 130, and other test platforms 120 and 130. In a preferred embodiment of the present invention, a resource usually refers to one of the switch trunks 112–114, 122–124, 132–134, 142–144, 152–154 and 162–164 or an operator services trunk from RES1 170 in trunk network 160. As will be explained, these resources are shared by test platforms 110, 120, 130, and 140, and are thus dynamically allocated in accordance with the present invention.

To perform a test, AOSM1 110 determines all the resources required for performing a test and requests CQM 100 to allocate the resources. CQM 100 determines whether the requested resources are available, allocates the available resources to AOSM1 110, and sends a message to AOSM1 110 indicating that the resources are allocated. AOSM1 110 performs the test and then releases the allocated resources.

However, while performing the test, AOSM1 110 waits for any messages indicating that an allocated resource has been de-allocated (i.e., allocated to some other test system), in which case AOSM1 110 waits until the resource is reallocated. CQM 100 of the present invention sends the corresponding de-allocation and re-allocation messages to AOSM1 110. CQM 100 de-allocates and re-allocates resources which are designated for non-blocking access as further explained below.

The present invention provides an option according to which a resource may be given non-blocking access to new command requests. If a request for such a resource is received from a test platform (AOSM2 120) when the resource is already allocated to second test platform (AOSM1 110), the resource is released from the second test platform (AOSM1 110), and provided to the test platform (AOSM2 120) requesting the resource. Once AOSM2 120 releases the resource, CQM 100 re-allocates the resource to the second test platform (AOSM1 110) so that AOSM1 110 may continue with the test.

As the resources are allocated dynamically (i.e., when a resource is needed) to a test and released upon completion of the test, the resources of the present invention are utilized optimally. Such an optimal utilization of the resources usually results in a decrease in the overall amount of time required to perform a set of tests. This reduction in time allows test system 199 to handle a greater volume of tests.

By providing a non-blocking access to some of the resources, the present invention achieves further efficiency in performing tests. Resources which are likely to be used only for short durations but in many tests, are suitable for designation for non-blocking access.

Each component of test system 199 is now explained in further detail. The method of the present invention is then explained with reference to FIG. 6.

AOSM1 110 may comprise a conventional computer system programmed to generate command requests and to perform tests in accordance with the present invention. To perform a test, AOSM1 110 first determines the resources required for the test. The resources required may be indicated by a program implementing a test on AOSM1 110. AOSM1 110 then sends command requests to CQM 100 on CQM connection network 150. Each command request indicates a resource required for the test. In a preferred embodiment, commands for all resources required for performing a test may be included in a single packet.

As noted above, the requested resources include connections to an originating switch and a terminating switch. An originating switch may be a first switch in a series of switches which provide a circuit connection to serve, for example, a telephone voice call. The circuit may span several intermediate trunks and intermediate switches. A termination switch may be the last switch which connects the call to a receiving party/device. However, in the test environment of the present invention, while testing any two switches in a circuit path, an earlier switch (i.e., closer to the first switch) in the circuit connection path may be treated as an originating switch and a later switch (i.e., farther from the first switch) in the circuit connection as a termination switch.

AOSM1 110 is shown connected to an originating test trunk 135 and a termination test trunk 165. For illustration purposes, AOSM1 110 is assumed to have requested RES1 170 as an originating switch and RES9 190 as a termination switch. To satisfy the requests, originating test trunk 135 is to be connected to one of originating switch trunks 112–114 of RES1 170, and terminating test trunk 165 is to be connected to one of terminating test trunks 591, 592 and 593 of RES9 190. DXC 125 performs the required connections under the control of CQM 125 as will be explained later.

Figure 2:
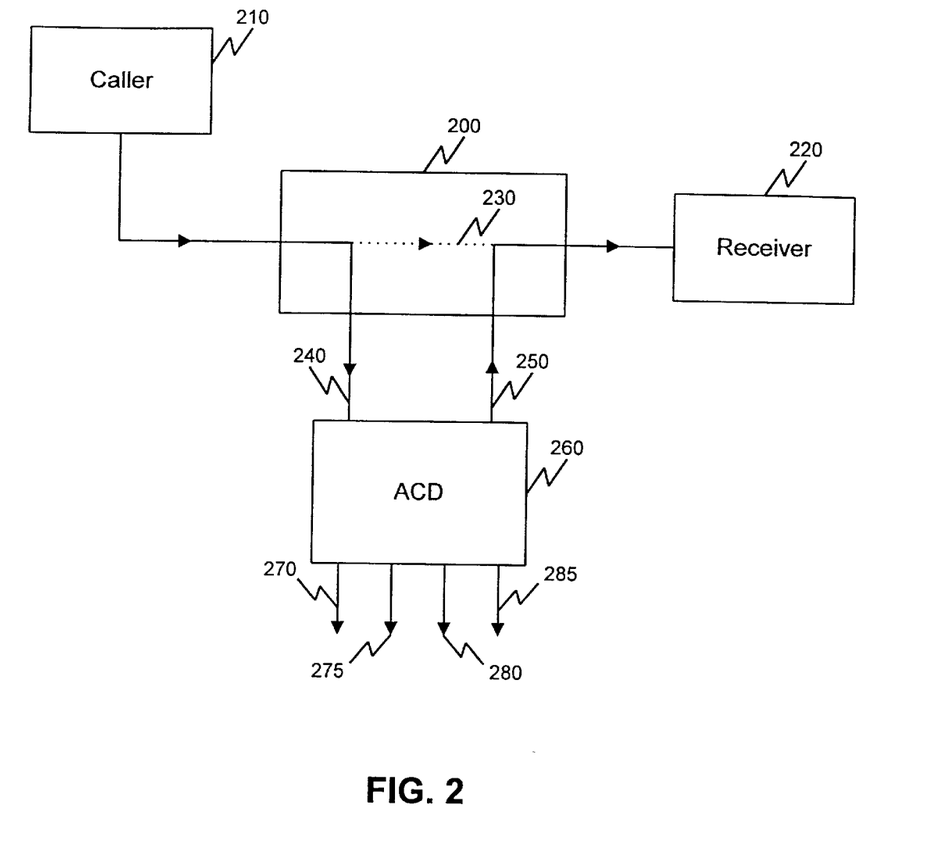
FIG. 2 is a block diagram illustrating an operator service call.

The resources required in a preferred embodiment may also include an 'operator service trunk'. An operator service trunk, as relevant to the present invention, is explained with reference to FIGS. 2 and 3. With reference to FIG. 2, switch 200 receives an operator service call (e.g., collect call) from a caller 210 and connects the call to automatic call distributor (ACD) 260 over line 240. ACD 260 may connect the call to one of the operators available to service the call over one of the lines 270, 275, 280 and 285. An operator receives the call, determines the telephone number of a receiving party (for example, by speaking to the caller), and dials the number over line 250. Once receiver 220 receives the call and agrees to accept the call, the operator establishes a connection between caller 210 and receiver 220. Caller 210 may then continue to communicate directly to receiver 220.

A bridging switch differs from a non-bridging switch in the manner in which an operator services call stays connected during a period caller 210 communicates with receiver 220. If switch 200 is a bridging switch, switch 200 bridges the two connections 240 and 250 internally, and connects the calls directly without having ACD 260 in the middle of the connection. The bridging is shown as a dotted line 230 in FIG. 2. Once the call is bridged, the trunks (or channels in the trunks) corresponding to 240 and 250 are released from the bridged call, and are available to service subsequent operator service calls. Hence, trunks 240 and 250 of a bridging switch may not be tied for the entire duration of the operator assisted call, i.e., during a period when caller 210 talks to the receiver 220. Trunks 240 and 250 may be expensive and it is therefore desirable that operator service calls be bridged.

On the other hand, if switch 200 is a non-bridging switch, the call stays connected over trunks 240 and 250 during the entire duration of the operator service call. The call may not be bridged internally within switch 200. To avoid tying up trunks 240 and 250 during an operator service call, a bridging switch may point a trunk to a bridging switch as further illustrated in FIG. 3.

Figure 3:
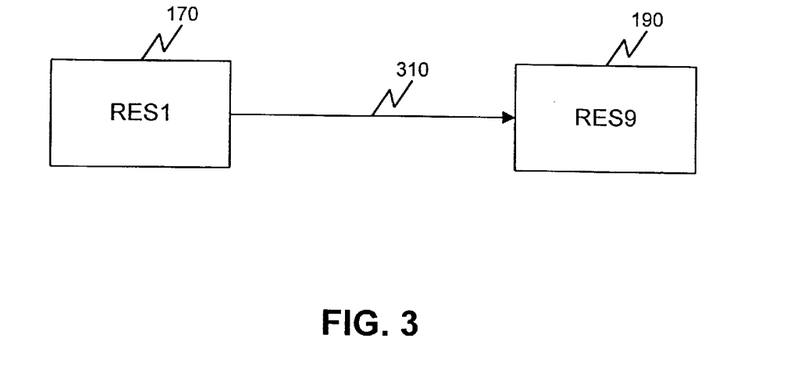
FIG. 3 is a block diagram showing a non-bridging switch pointing to a bridging switch to service an operator service call.

In FIG. 3, for the purpose of explanation, RES1 170 is assumed to be a 'non-bridging switch' such as a DEX-600E switch available from DSC Communications Corporation, and RES9 190 is assumed to be a 'bridging switch' such as a DMS-250 switch available from Nortel (Northern Telecom) Corporation. To handle operator service calls more efficiently, non-bridging switch RES 1170 may point an operator service trunk 310 to bridging switch RES9 190. Operator service trunk 310 may be included in trunk network 160 of FIG. 1.

By pointing the operator service trunk 310 to RES9 190, RES1 170 forwards all operator services calls to RES9 190. As RES9 190 is a bridging switch, trunks such as 240 and 250 of FIG. 2 may not be tied-up during the entire duration of an operator service call. However, an operator services trunk may point to only one bridging switch. Therefore, if an operator services trunk is pointing to a switch other than a desired bridging switch, a test may need to wait until the operator services trunk becomes available to be pointed to the desired bridging switch. In the present invention, such an operator service trunk is treated as a resource which is allocated among different tests.

Continuing with the description of components of test system 199 with reference to FIG. 1, DXC 125 receives connect commands from CQM 100 and provides the specified connections between test platforms 110, 120, 130, 140 and switches 170, 180, 190. DXC 125 may be one of several commercially available (e.g., available from DSC Communications Corporation) digital cross connect switches. DXC 125 may be capable of connecting any test trunk to any switch trunk as specified by a connect command received from CQM 100.

Switches 170, 180, and 190 are connected by several service trunks shown together as trunk network 160. The service trunks generally carry data traffic corresponding to, for example, telephone voice calls. The service trunks include operator services trunks from non-bridging switches. Each switch 170, 180, 190 is connected to DXC 125 by several pairs of switch trunks. One of the two trunks in each pair is designated as an originating test trunk (112–114, 132–134, and 152–154), and the other a terminating test trunk (122–124, 142–144, and 162–164).

In a preferred embodiment, the number of pairs from each switch 170, 180, and 190 is less than the number of test platforms. Test system 199 of FIG. 1 is shown with four test systems 110, 120, 130 and 140, while each switch is shown connected to DXC 125 by three pairs of test trunks. Thus, the test trunks are shared by test systems 110, 120, 130, and 140.

Figure 7:
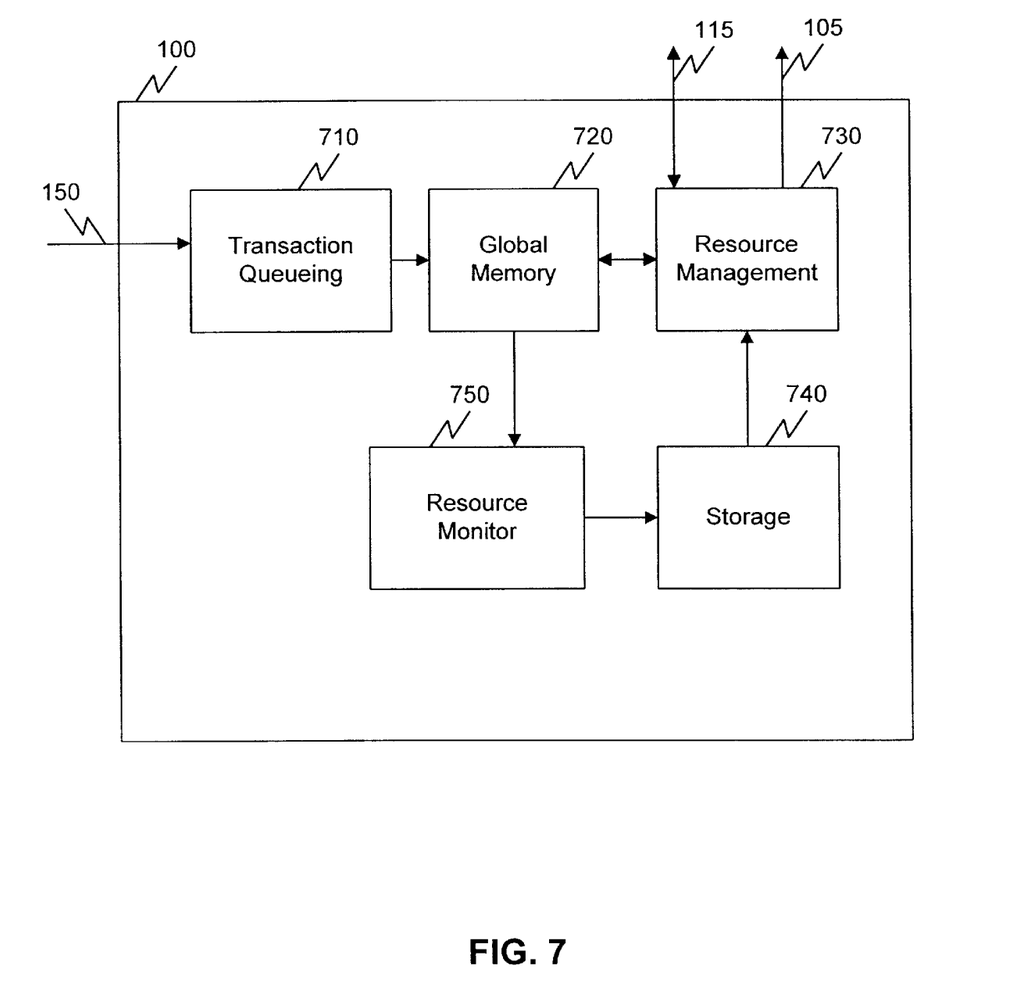
FIG. 7 is a block diagram of a configuration queue manager (CQM) illustrating the components therein in accordance with the present invention.

The operation of CQM 100 is now explained in detail with reference to FIG. 7. FIG. 7 is a block diagram of CQM 100 including transaction queuing module 710, global memory 720, resource management module 730, and storage 740. A broad overview of the operation of the components is provided first. Detailed description of operation of each component of CQM 100 is then provided.

Generally, transaction queuing module 710 receives a packet over CQM connection network 150 and separates the command requests in the packet. Global memory 720 stores the command requests and information pertaining to queues and status for the resources managed by CQM 100. Resource management module 730 determines the availability of resources and allocates the available resources. Systems monitor 750 enables the display of the status of various resources on a display. In addition, an operator may modify the configurations by manually entering commands using systems monitor 750. Storage 740 stores mapping information indicating which port of DXC 125 is connected to which test trunk or which switch trunk. Each component of CQM 100 is now described in detail.

Transaction queuing module 710 receives a packet including command requests for resources via CQM connection network 150, separates the commands in the packet, and sends the commands over command bus 712. The command requests include data specifying, for example, whether the request is for a connection or for an operator services trunk. The command also includes data relevant to the type of request. For example, if the request is for a connection, the command specifies an origination trunk and a termination trunk. If the request is for an operator services trunk, the command specifies a bridging switch and a non-bridging switch, and whether the trunk is to be allocated in a blocking mode or non-blocking mode.

In one embodiment, transaction queuing module 710 includes a parser to examine the data received from a test platform and to generate equivalent commands. The parser may determine the resources required for processing each command request. For example, a command request may request a connection from RES1 170 to AOSM1 110. The command request may require at least two resources, i.e., a test trunk from RES1 170 to DXC 125 and a switch trunk from DXC 125 to AOSM1 110. The parser accordingly determines that the two resources are required for processing the command request. The parser may generate multiple sub-commands that correspond to each command. However, in the present application such sub-commands are also referred to as command requests as some of the functions of the parser may be implemented in the test platforms itself. The implementation of such a parser will be apparent to one skilled in the relevant art from the description provided herein.

Global memory 720 receives command requests over bus 712 from transaction queuing module 710, and stores the command requests. The information stored in global memory includes information corresponding to status of each resource as explained below with reference to FIG. 4. One embodiment of CQM 100 is implemented on a DEC (Digital Equipment Corporation) machine which allows multiple processing entities to be executing in parallel. Such entities may include processes, threads etc. By storing all the information in global memory 720, the embodiment enables several parallel executing entities to perform corresponding tasks in parallel. For example, systems monitor 750 may be performing a display function in parallel while resource management module 730 allocates resources. Additional modules (for example, for network management) may be easily added without modifying other parts of the software due to such storing in global memory 720. Also, if a configuration requires additional resources, multiple threads may execute in parallel to allocate the resources in parallel. Such parallel processing may result in faster response time in allocating the resources required for a configuration.

Figure 4:
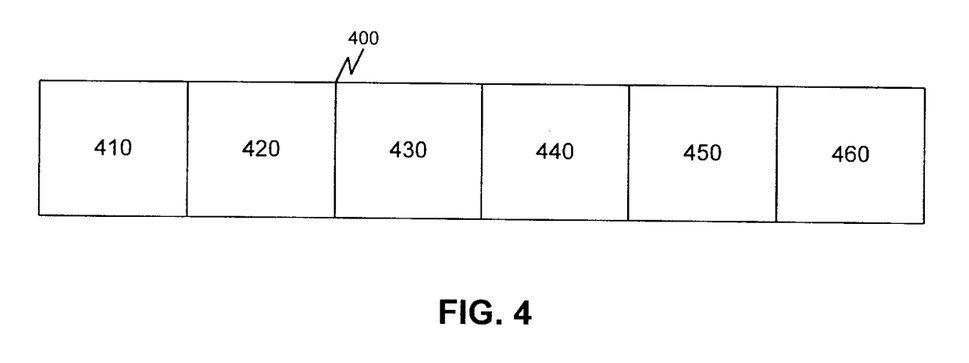
FIG. 4 is a diagram illustrating the information maintained by a configuration queue manager in allocating an operator services trunk to test platforms.

Global memory 720 also stores information indicative of the status of each resource as will be explained now with reference to FIG. 4. FIG. 4 illustrates an example status data element 400 which is associated with each resource. Status field 410 indicates whether the resource is idle or busy or queued. An idle status indicates that the resource is not presently allocated to any test platform. A busy status indicates that the resource has been allocated to a test platform, but it has not yet been released by the test platform. A queued status implies not only that the corresponding resource is allocated, but also that there are additional commands requesting the resource.

Owner field 420 specifies the test platform to which the resource is allocated. Type field 430 specifies whether the resource is allocated for blocking or non-blocking access. In one embodiment, the type is specified when a test platform requests a resource, and the type field 430 is set to the specified type when the resource is allocated to the test platform. All subsequent requests for the resource are processed according to the type specified. If the type is blocking access, the resource is unavailable for subsequent requests until the resource is released.

Control field 440 indicates the processing entity identification (e.g., thread ID) which allocated the resource. The field may also specify whether the resource has been manually allocated by an operator using, for example, resource monitor 750. Link field 450 specifies a link (e.g., a pointer) to an associated resource. The links together specify a path of the resources allocated. The link field for the resource last in the chain may be set to a value such as NULL to indicate the end of the chain. All the resources in a chain together specify the configuration for the test that is using the resources in the chain. Link field 450 is useful to determine all the resources allocated for a configuration, and such a feature may be used, for example, in the management of resources using resource monitor 750. The use of field 460 depends upon the specific resource Type. If the resource is an operator services trunk, field 460 stores a value indicative of the bridging switch to which the operator service is presently pointing to.

For an efficient memory utilization, one embodiment of global memory 720 uses a compressed bit map for storing such information. That is, each bit in a byte may be used to indicate the status of a corresponding resource and a program is designed to properly interpret the bits. The program may be implemented in software, hardware, firmware or the combination of the like.

Continuing with the description of the modules of FIG. 7, resource management module 730 processes the command requests stored in global memory 720. To process the commands for a requested configuration, resource management module 730 first determines whether all the required resources are available. If all the resources are available, resource management module 730 allocates the requested resources. While allocating a resource, resource management module 730 updates status data element 400 for each resource allocated. Link fields 460 of all the resources together indicate configuration provided as a result of the allocation.

If a resource is not available, resource management module 730 places the resource request command in a queue corresponding to the resource until the resource becomes available for allocation to the command. After allocating all the resources, resource management module 730 sends a message on CQM connection network 150 to the test platform performing the test indicating that the resources have been allocated.

Resource management module 730 may deallocate a resource from a test platform if the resource is specified for non-blocking access. Field 440 specifies whether the resource is specified for blocking or non-blocking access. In one embodiment, the operator services trunks may be specified for non-blocking access. Thus, if resource management module 730 receives a request for an operator services trunk from a new test system when the trunk is allocated to another test system, resource management module 730 deallocates the trunk from the other system, places the other system in a queue for the trunk, and allocates the trunk to the new system. Once the new system releases the trunk, the trunk is reallocated to the other system placed in the queue.

While allocation and deallocation, the fields of status data element 400 are modified to indicate the status of the resources. For example, link fields 460 may be updated to indicate that a resource has been deallocated from the configuration for the test. State field 420 is updated to indicate that the corresponding resource is queued with the test platform (or a command request therefore) which has been deallocated the resource. Owner field 420 is set to indicate the new test platform which has been allocated the resource. Upon reallocation, the fields of status data element 400 are again updated to indicate that the resource is allocated to the test platform which has been placed in the queue.

The manner in which CQM 100 processes command requests for an operator services trunk is explained first, followed by the explanation of processing for commands for connections to the switches 170, 180, and 190.

Figure 5:
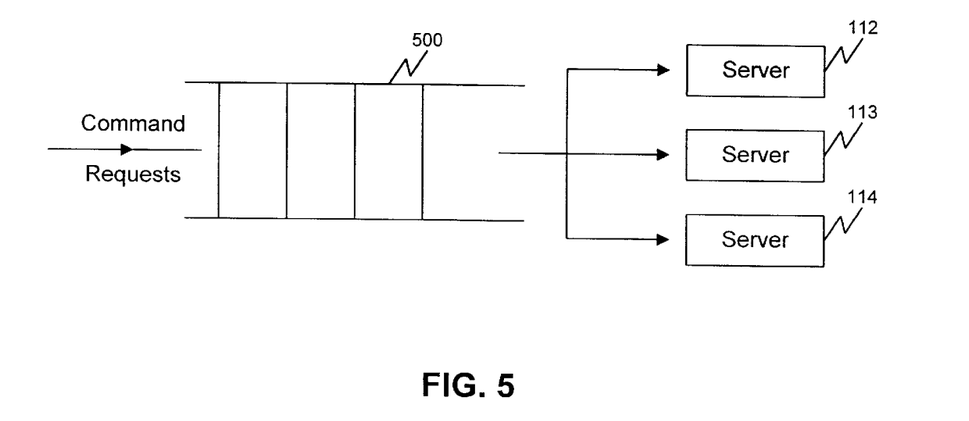
FIG. 5 illustrates a queue structure maintained by a configuration queue manager for allocating shared resources in accordance with the present invention.

As already explained with reference to FIGS. 2 and 3, each operator services trunk may point to only one bridging switch. Resource management module 730 maintains a queue for each operator services trunk (such as shown in FIG. 5 but with a single server in a preferred embodiment). When an operator service trunk is unavailable and the trunk is specified for blocking access, the command requests received are queued in a corresponding operator services trunk queue. An operator services trunk is unavailable if it is allocated to a test platform and the test platform has not yet released the trunk. However, if the trunk is unavailable but specified for non-blocking access, the trunk is de-allocated from a test system from a test platform that is presently allocated the trunk, and then the trunk is allocated to another test system sending the new command. Resource management module 730 sends a message to the test system blocking access. Accordingly, when the test system is allocated the operator services trunk, field 430 is set to indicate blocking or non-blocking access. Thus, if field 430 indicates blocking access, all subsequently received new commands for the operator services trunk are placed in the corresponding queue. If field 430 indicates non-blocking access, a subsequent command may cause the operator services trunk to be de-allocated from the present test platform indicated in field 420.

By allowing a test system requesting the operator services trunk to specify blocking or non-blocking modes, the present invention enables a test itself to make the determination whether the test needs guaranteed access until the test releases the operator services trunk. Also, if a test is not designed to properly work with deallocation of an operator services trunk in the middle of the test, the corresponding command requests may specify that the trunk is needed in a blocking mode. By default, the present invention allocates operator services trunks in blocking mode to ensure backward compatibility with tests that may not be designed for non-blocking access.

After completion of a test, resource management module 730 receives a command from global memory 720 which indicates that the resources allocated to the test may be released and allocated to other test platforms. Resource management module 730 modifies status data 400 to indicate that the operator services trunk is not being used by AOSM1 110 (assuming AOSM1 110 completed performing the test). Such modification may entail deleting an identifier for AOSM1 110 from the owner field 420. If no more command requests are waiting in the queue for the corresponding resource, state field 410 is set to indicate that the resource is idle. If resources are waiting, resource management module 730 allocates the resource to the test platform sending the command in the queue according to a first come first serve basis. If additional from which the trunk has been de-allocated, and places a request for the de-allocated test system in the queue for the trunk.

In a preferred embodiment, the command requests in the queue are serviced in a first-come-first-serve model well known in the art. That is, when an operator services trunk becomes available, the trunk is allocated to the command which has been waiting the longest period in the queue. Such command is then deleted from the queue.

To allocate an operator service trunk to a test system sending a command, resource management module 730 changes the configuration of the trunk on the bridging switch from which it originates. To change the configuration of the operator services trunk to point to RES9 190, resource management module 730 logs on to RES1 170 using path 115 and sends commands to cause the operator services trunk to point to RES9 190. In a preferred embodiment, resource management module 730 may use well-known tools such as scripts to log on to RES1 170 and reconfigure the operator services trunk direction.

After configuring an operator services trunk from non-bridging switch (RES1 170) to point to bridging switch (RES9 190), resource management module 730 updates the field of status data element 400 to indicate the change in status for the bridging switch 190. Specifically, field 460 is updated to store a value indicative of the new bridging switch RES9 190. Field 420 indicates the test platform which is presently allocated the operator services trunk. Field 430 indicates whether the operator services trunk is presently allocated for blocking or non-blocking access. Field 440 indicates an identification of a processing entity (e.g., thread ID) which allocated the bridging switch.

In one embodiment, a test system specifies in the corresponding command request whether the operator services trunk is required with blocking or non-commands are waiting for the resource, state field 410 remains in Queued status, or else status field 410 is set to busy status.

A test system thus allocated the operator services trunk may be one which was earlier de-allocated the trunk. Upon receiving a corresponding re-allocation message, the test system may resume with the test if it was waiting for the operator services trunk to be reallocated. However, if the test was not waiting for the operator services trunk, the test system may simply change an internal variable to indicate that the operator service trunk is now again allocated.

The manner in which resource management module 730 processes the command requests in relation to establishing connections between test platforms 110, 120, 130, 140 and switches 170, 180 and 190 is now explained. In general, CQM 100 first determines whether any of the switch trunks are available for connection to the test platform, determines the ports on DXC 125 for the available switch trunks and the test trunks of the test platform, and then sends connect commands to DXC 125 to provide the requested connection. The operation of CQM 100 in providing the desired connection is described in further detail now.

Resource management module 730 maintains a queue (shown as 500 in FIG. 5) in global memory 720 to queue all requests to originating trunks of a switch, and another queue to queue all requests to terminating trunks of the switch. Assuming AOSM1 110 sends a command requesting a connection to origination trunk of RES1 170 and a termination trunk of RES9 190, the command may be placed in two queues, i.e., in a queue for switch trunks 112–114 of RES1 170 and in another queue for switch trunks 162–164 of RES9 190.

The switch trunks may be allocated in a first come first serve basis well known in the art. As each queue is processed by multiple testing trunks, a single queue multiple server model (also well known in the art) is employed. Each test platform 110, 120, 130, 140 sends a command releasing a switch trunk once the test using the trunk is completed. Accordingly the released switch trunk is available to serve the next command request (i.e., the command waiting for longest time) in queue 500, i.e., the command or test platform next in queue 500 is allocated the released switch trunk.

To determine which of the ports of DXC 125 are to be connected to provide the connection requested by a command, CQM 100 maintains one or more tables (or maps) indicating which ports (of DXC 125) are coupled to which switch/test platform. The data for the maps is stored in storage 740. Thus, if a switch trunk or test trunk is moved to a different port on DXC 125, a user need only change the data on storage 740. Resource management module 730 examines the map to determine which ports are to be connected to achieve the desired connection.

After determining which ports in DXC 125 are to be connected, resource management module 730 sends connect commands on RS-232 line 105 to connect the corresponding ports. In the above example in which AOSM1 110 is assumed to send a command requesting a connection to origination trunk of RES1 170 and a termination trunk of RES9 190, a first connect command causes DXC 125 to connect AOSM1 110's origination trunk 135 to RES1 170 as shown by a dotted line. CQM 100 then sends another connect command to DXC 125 to cause test trunk 165 to be connected to switch trunk 591 (dotted line connection not shown). The specific format of connect commands sent is dependant on the implementation of DXC 125.

After allocation of the trunk, the status data element 400 of the trunk is also updated. Owner field 420 is set to a value indicative of AOSM1 110 in the above example. Type field 430 is always blocking in one embodiment. State field 410 is set to busy once the trunk is allocated. Link field 460 and control field 450 are explained above.

Once all the resources required for a test are available and allocated, resource management module 730 sends a message on CQM connection network 150 to the test platform performing the test. The message indicates that the requested resources have been allocated. In response, the test platform begins running the test. After the test is complete, the test platform releases any shared resources as explained above.

However, if any of the requested resources for a test is unavailable, a preferred embodiment of the present invention does not allocate any of the requested resources. Resource management module 730 places the command request (including a test platform identification) in a queue corresponding to the unavailable resource, and sends a message to the requesting test platform indicating which of the resources have been unavailable, and how many members are ahead in the corresponding queue. Once such an unavailable resource becomes available, resource management module 730 allocates the resource to the test platform first in the queue, and indicates to the test platform that the resource is allocated to the test platform.

Continuing again with the detailed description the modules included in CQM 100, resource monitor 750 enables an operator to verify the status of different resources. In one embodiment, a graphical user interface is used in resource monitor 750 to display the status of various resources. Using resource monitor 750, an operator may modify status data element 400 for different resources. Such a feature enables the operator to change information to correspond to any unforeseen circumstances. For example, if a test aborts in the middle before releasing a resource, the operator may manually change the entries in memory 720 to make the resource available to subsequent tests.

Figure 6:
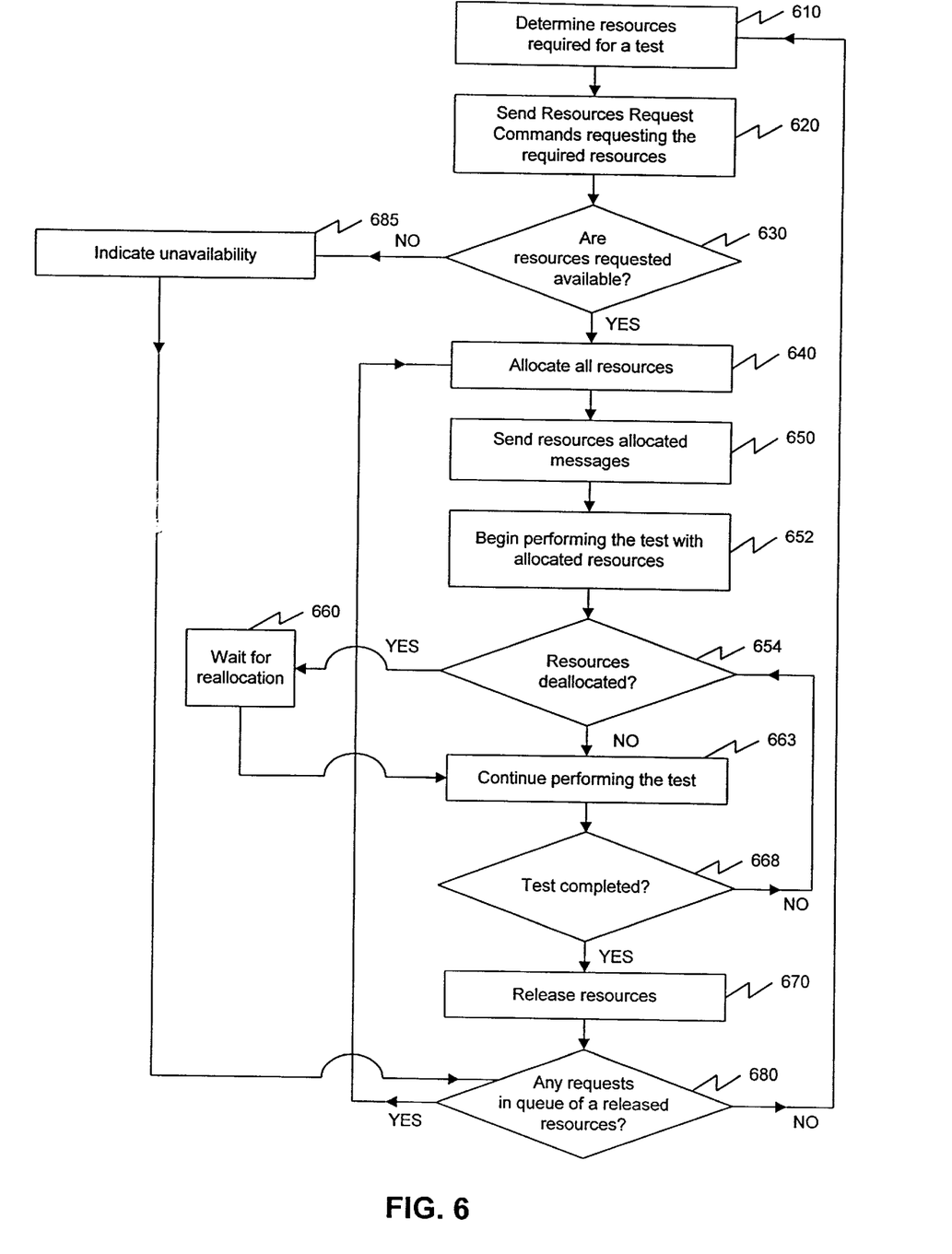
FIG. 6 is a flow-chart illustrating the steps performed by a test system in one embodiment of the present invention.

The operation of various components in test system 199 is summarized again with reference to the flow-chart of FIG. 6. For clarity, the flow-chart is explained with reference to AOSM1 110. The process begins in step 610, where AOSM1 110 determines the resources required for conducting a test. The resources generally include connections to an originating switch and a connection to a termination switch, and possibly an operator services trunk as explained above. However, it will be appreciated that other resources required for performing a test may also be included by one skilled in the art by using the description provided in the present application.

In step 690, AOSM1 110 sends a packet to CQM 100 requesting all the resources required for performing a test. In step 630, CQM 100 determines whether the required resources are available as explained above with reference to FIGS. 1, 4, 5, and 7. If all the required resources are available, CQM 100 allocates each required resource to AOSM1 110 in step 640 as also explained above with reference to FIGS. 1, 4, 5, and 7. In step 640, CQM 100 sends a resources allocated message to AOSM1 110.

In response to a resource allocated message, AOSM1 110 begins performing the test with the allocated resources in step 652. Before using a resource which may be deallocated, AOSM1 110 checks whether the resource (e.g., operator services trunk) is de-allocated in step 654. If the resource is de-allocated, AOSM1 110 waits for re-allocation of the resource, and continues performing the test in step 663.

If the resource is determined not to have been de-allocated in step 654, AOSM1 170 continues performing the test in step 663. In step 668, AOSM1 170 tests whether the test is completed. AOSM1 170 repeats steps 654–668 until the test is completed. AOSM1 170 then sends a message to CQM 100 to release the allocated resources.

In step 680, CQM 100 checks whether other test platforms 120 or 130 are waiting for any of the released resources. If any test platforms are waiting for a released resource, and if the released resource is the only resource the waiting test platform is waiting for, CQM 100 allocates the resources in step 640 for the waiting work platform.

If CQM 100 determines that a required resource is unavailable in step 630, CQM 100 sends a resource unavailability message to AOSM1 110 in step 685, and places AOSM1 110's request in a queue corresponding to the unavailable resource. CQM 100 waits for the resource to be available in step 680.

It will thus be appreciated that CQM 100 serves as a central platform for dynamically allocating all the resources required by test platforms 110, 120, 130 for performing a test. The resources may be accessed in non-blocking mode (e.g., operator services trunk) or blocking mode (connections between switches and test platforms in one embodiment). The present invention further provides additional connections (e.g., bus 115 of FIG. 1) for CQM 100 to perform any configuration changes to the resources (e.g., RES1 170 of FIG. 1).

Resources which are used for a short duration but by many tests (or multiple times within a test with long intervals in between), are normally requested for allocation in a non-blocking mode. Such a resource is not tied to any test platform, but is available for allocation for other test platforms if required. Thus, a resource may be utilized more efficiently, thereby decreasing the aggregate amount of time in performing a set of tests.

As the resources are allocated just prior to the performance of a test and released upon completion of the test, the resources may be optimally utilized, thereby resulting in a further decrease in overall time required for completing the tests. By allocating a resource only if all resources required for a test are available, test system 199 may avoid deadlock problems known in the art.

It will be further appreciated that various modifications can be made to the embodiments described above by one skilled in the art by reading the description provided herein without departing from the scope and spirit of the present invention. For example, test system 199 may be modified such that a single computer system may allow performance of several tests in parallel. Each of such tests may be implemented to run in parallel by using, for example, a process for each test. In such a case, each test platform 110, 120, 130 and 140 may refer to such a process running a test.

Thus, while various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A test system comprising:
   a plurality of switches including a bridging switch and a non-bridging switch, wherein an operator services trunk originates from said non-bridging switch;
   a test platform for performing a test on said bridging switch and said non-bridging switch, said test platform being coupled to a pair of test trunks comprising a first test trunk and a second test trunk, said test platform sending a first command requesting a connection to each of said bridging switch and said non-bridging switch, and a second command requesting that said operator services trunk point to said bridging switch, said second command further specifying that said bridging switch be allocated in a non-blocking mode;
   a cross-connect coupled to said test platform by said pair of test trunks, said cross-connect also being connected to each of said plurality of switches by a switch trunk; and
   a manager coupled to said cross connect and said test platform, said manager receiving said first command and said second command from said test platform, said manager determining whether said switch trunks connected to said bridging switch and said non-bridging switch are available, said manager sending a plurality of connect commands to said cross-connect to connect said switch trunks to said pair of test trunks, said manager allocating said operator services trunk to said test platform by configuring said operator services trunk to point to said bridging switch to process the second command,
   wherein said cross-connect connects said switch trunk coupled to said bridging switching to said first test trunk, and said switch trunk coupled to said non-bridging switching to said second test trunk in response to said plurality of connect commands,
   wherein said manager allocates said bridging switch to said test platform in a non-blocking mode such that said manager allocates the bridging switch to a second test bridge in response to a third command from a second test platform, and
   wherein said test platform performs said test after said manager completes processing said first command and said second command.

2. A test system for testing a plurality of switches, said test system comprising:
   a first test platform for performing a first test, and a second platform for performing a second test, wherein both of said first test platform and said second test platform require a shared resource to perform said first test and said second test respectively, said first test platform sending a first command requesting said shared resource in one of blocking mode and non-blocking mode and said second platform then sending a second command requesting said shared resource; and
   a manager for receiving said first command and allocating said shared resource to said first test platform, then receiving said second command,
   wherein said manager deallocates said shared resource from said first test platform and allocates said shared resource to said second test platform if said first test platform requested said shared resource in non-blocking mode in said first command,
   wherein said first test platform and said second test platform initiate said first test and said second test respectively upon being allocated said shared resource.

3. The test system of claim 2 wherein said first test platform maintains control of said shared resource after said manager receives said second command if said first test platform requested said shared resource in blocking mode in said first command, and wherein said manager allocates said shared resource to said second test platform upon receiving a resource release command from said first test platform.

4. The test system of claim 3, wherein said manager maintains a queue for said shared resource, and queues said second command in said queue until said resource release command is received.

5. The test system of claim 4, further comprising a cross connect, wherein said cross connect is coupled to said first test platform by a first test trunk and to said second test platform by a second test trunk, said cross connect also being connected to one of said switches by a switch trunk, said cross connect providing a connection between said one said switches and one of said two test platforms by connecting said test trunk to said switch trunk, and wherein said resource comprises said connection.

6. The test system of claim 5 wherein said queue is managed according to a first come first serve scheme.

7. The test system of claim 6, wherein said manager further comprises:
   a storage for storing information indicative of which ports of said cross-connect are connected to said switch trunk and said test trunks;
   a resource management module for examining said information stored in said storage to determine which ports are to be connected to provide said connection requested by said commands, said resource management module sending a connect command to said cross-connect to cause said cross-connect to provide said desired connections.

8. The test system of claim 7, wherein said manager further comprises a memory for storing information corresponding to said queue.

9. The test system of claim 2 wherein said manager maintains a queue for said shared resource, and wherein said manager places said first command in said queue upon deallocation of said shared resource from said first test platform.

10. The test system of claim 9 wherein said second test platform sends a release command to release said shared resource, and wherein said manager reallocates said shared resource to said first test platform upon receiving said release command.

11. The test system of claim 10 wherein said resource is an operator services trunk originating from a non-bridging switch and pointing to a bridging switch, and wherein said non-bridging switch and said bridging switch are comprised in said plurality of switches.

12. The test system of claim 11 further comprising a means to enable said manager to automatically log on to said non-bridging switch to change configuration on said non-bridging switch to have said operator services trunk point to said bridging switch.

13. A method of performing a plurality of tests comprising a first test and a second test, wherein a shared resource is required for performing the first test and the second test, the method comprising the steps of:

sending from a first test platform a first command requesting the shared resource in one of blocking mode and non-blocking mode;

sending from a second test platform a second command requesting the shared resource;

receiving the first command and then the second command in a manager;

allocating the shared resource to the first test platform in response to receiving the first command; and deallocating the shared resource from the first test platform and allocating the shared resource to the second test platform if the first test platform requested the shared resource in non-blocking mode in the first command.

14. The method of claim 13 wherein the resource comprises a connection to a switch, and wherein the step of allocating the shared resource to the first platform further comprises the steps of:

determining the ports on a cross-connect which are connected to a test trunk from the first test platform and a switch trunk from the switch; and sending a connect command to the cross-connect to cause the cross-connect the ports corresponding to the test trunk and the switch trunk to provide the desired connection.

15. The method of claim 13 wherein if the shared resource is requested in non-blocking mode by the first test platform, the method further comprises the steps of:

performing the second test using the shared resource allocated;

receiving a release resource command from the second test platform;

reallocating the shared resource to the first test platform after receiving the release resource command; and performing the first test using the shared resource allocated.

16. The method of claim 12 wherein the step of allocating further comprises sending a connect command to a cross connect, wherein the cross connect dynamically connects the test platform to the switch in response to the connect command.

17. A computer program product for use with a computer comprising a computer usable medium having computer program logic embodied thereon for managing the allocation of a shared resource between a first test platform and a second test platform, wherein the shared resource is required by the first test platform to perform a first test and the second test platform to perform a second test, the computer program logic comprising:

first computer program code means for causing the computer to receive a first command from the first test platform requesting the shared resource in one of blocking mode and non-blocking mode;

second computer program code means for causing the computer to allocate the shared resource to the first test platform in response to receiving said first command;

third computer program code means for causing the computer to receive a second command from the second test platform requesting the shared resource; and fourth computer program code means for causing the computer to deallocate the shared resource from the first test platform and allocate the shared resource to the second test platform, if the first test platform requested the shared resource in non-blocking mode in the first command.

18. The computer program product of claim 17, wherein said second command is received prior to receiving a resource release command from said first test platform.

19. The test system of claim 2, wherein said second command is received prior to receiving a resource release command from said first test platform.

20. The method of claim 13, wherein said second command is received prior to receiving a resource release command from said first test platform.

* * * * *